United States Patent [19]

Bartholl

[11] 4,283,445

[45] Aug. 11, 1981

[54] NON-WOVEN ORGANIC MULCH BLANKET WITH POLYVINYLACETATE COPOLYMER BINDER

[76] Inventor: Klaus Bartholl, 1920 Riverfield, Howick, Quebec, Canada, JQS 1G0

[21] Appl. No.: 51,895

[22] Filed: Jun. 25, 1979

[51] Int. Cl.³ .............................................. A01N 3/00
[52] U.S. Cl. .................................... 428/17; 427/212; 427/392; 427/396; 428/198; 428/288
[58] Field of Search ......................... 428/17, 288, 198; 427/212, 392, 396

[56] References Cited

U.S. PATENT DOCUMENTS 225,735   3/1880   Townsend ........................... 428/44

Primary Examiner—Marion McCamish
Attorney, Agent, or Firm—Swabey, Mitchell, Houle, Marcoux & Sher

[57] ABSTRACT

A mulch blanket includes randomly oriented organic fibers held by a non-toxic biodegradable polymer binder. A method of forming the mulch blanket includes the steps of randomly laying short organic fibers in an elongated pile along a predetermined path and arranging the top exposed surface of the pile to be flat. A non-toxic biodegradable polymeric binder is then sprayed over the top exposed surface, curing the binder, and then the blanket is peeled off the pile.

5 Claims, 4 Drawing Figures

4,283,445

NON-WOVEN ORGANIC MULCH BLANKET WITH POLYVINYLACETATE COPOLYMER BINDER

BACKGROUND OF THE INVENTION

Field of the Invention

The present invention relates to the manufacture of a non-woven organic mulch blanket.

SUMMARY OF THE INVENTION

A construction in accordance with the present invention comprises a non-woven organic mulch blanket including randomly oriented organic fibers held by a binder which is a non-toxic biodegradable polymer.

A method in accordance with the present invention includes the steps of randomly laying short organic fibers in an elongated pile along a predetermined path and arranging the top exposed surface of the pile to be flat, spraying a non-toxic biodegradable polymeric binder on the top exposed surface, curing said binder, and peeling off said so-formed blanket from the pile.

BRIEF DESCRIPTION OF THE DRAWINGS

Having thus generally described the nature of the invention, reference will now be made to the accompanying drawings, showing by way of illustration, a preferred embodiment thereof, and in which.

DESCRIPTION OF THE PREFERRED EMBODIMENTS

Figure 1:
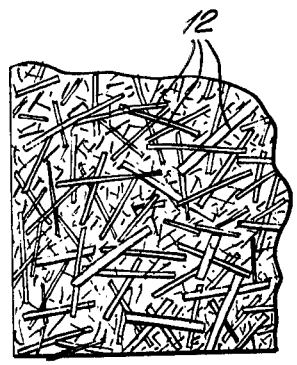
FIG. 1 is a fragmentary top plan view of a typical blanket in accordance with the present invention.
Figure 2:
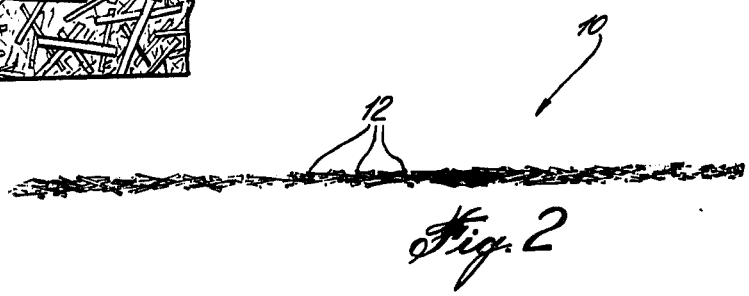
FIG. 2 is a vertical cross-section taken through the typical blanket of FIG. 1.

Referring now to the drawings, FIG. 1 shows a small fragmentary section of a mulch blanket 10 made in accordance with the present invention which includes randomly laid and, therefore, randomly oriented short fibers of straw 12 which are held together in a non-woven manner by a non-toxic biodegradable polymeric binder.

Preferably, the mulch fibers 12 used to form the blanket 10 are anywhere in size from dust particles to 2" in length. The organic fibers could be any good mulching material, such as straw, hay, or alfalfa. The binder preferably used is one sold by the Hoechst Company under the trade mark "CURASOL", which is an aqueous dispersion of polyvinylacetate copolymer, which can be prepared according to Canadian Pat. No. 721,922, issued Nov. 23, 1965. Polyvinylacetate is biodegradable and non-toxic, and has marked binding properties with respect to mulching materials.

In use, the so-formed mulch blankets could be approximately ½" thick and could be sold in widths of anywhere from 1 to 8 feet or more, if necessary. The blankets could be a stiff pallet or a flexible continuous blanket. The mulch blanket 10 would be useful for normal mulching utility, such as erosion control or frost control. Lime could also be added as well as nitrogen, potash, phosphates or other nutrients, in a predetermined manner on the blanket so as to add these necessary minerals to the soil where required. It is also contemplated that seeds could be printed on the mulching blanket 10 as well as a weed deterrent.

Figure 3:
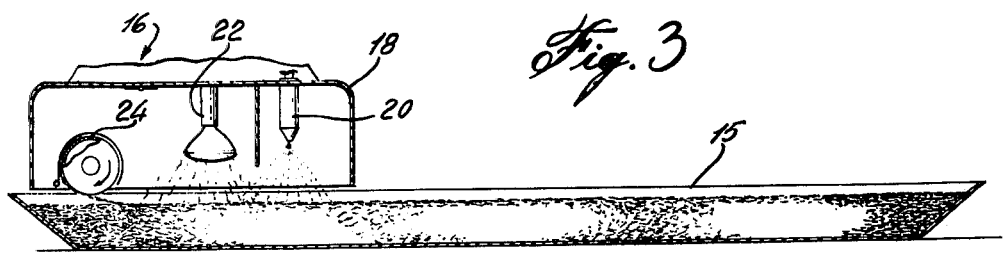
FIG. 3 is a vertical cross-section taken through a typical apparatus for manufacturing the blanket.
Figure 4:
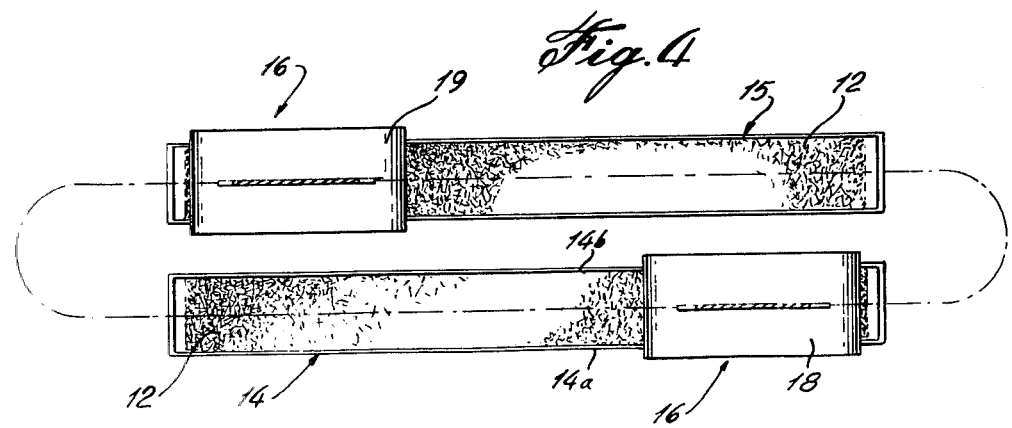
FIG. 4 is a top plan view of a continuous mulch blanket operation.

The preferred method for manufacturing the mulch blanket 10 is by utilizing the apparatus illustrated in FIGS. 3 and 4. The straw fibers 12 are first loaded into an elongated bin 14 having side walls 14a and 14b. A treatment unit 16 travels on overhead tracks (not shown) and includes a housing 18 to which is attached the spray nozzles 20 for spraying the "CURASOL". Following the spray nozzles 20 would be a curing device, such as an infrared lamp or industrial lighting as illustrated at 22. Following the curing device 22 would be a roll-up device 24. The overhead track could be arranged in a loop, such as shown in FIG. 4, and a separate bin 15 could be arranged parallel to the bin 14. The treatment unit 16 could be made to travel over both bins 14 and 15 or an additional unit 19 could be utilized.

As the housing 18 advances over the bin, the spray nozzles 20 will spray the liquid "CURASOL" over the top layer of the straw fibers 12. The amount of "CURASOL" sprayed would only be to a depth necessary to form a film. It has been found that by providing a mist of the "CURASOL" over the fibers, a suitable blanket is formed. The curing device 22 hardens the binder such that as the roll-up device 24 picks up the so-formed blanket from the pile of fibers, the blanket will stay intact.

Once a length of mulch blanket 10 has been formed, it is taken off the roll-up device, and the operation is repeated.

I claim:

1. A non-woven mulch composite blanket adapted to be laid on a ground area comprising a sheet-like member made up of randomly oriented organic fibers each having a length not exceeding 2" and a binder of a non-toxic biodegradable polyvinylacetate copolymer such as to form a self-supporting sheet.

2. A blanket as defined in claim 1, wherein the fiber lengths vary between dust particle size and 2".

3. A non-woven organic mulch blanket as defined in claim 1, wherein the blanket is formed in widths of between 1 to 8 feet and is approximately ½" thick.

4. A method of manufacturing a non-woven organic mulch blanket comprising the steps of randomly laying short organic fibers in an elongated pile along a predetermined path and arranging the top exposed surface of the pile to be flat, spraying a non-toxic biodegradable polyvinylacetate copolymer binder on the top exposed surface, curing said binder, and peeling off the so-formed blanket from the pile along said path.

5. A method as defined in claim 4, wherein the blanket so-formed by peeling, is rolled.

* * * * *